(12) United States Patent
Tanaka et al.

(10) Patent No.: US 7,163,760 B2
(45) Date of Patent: Jan. 16, 2007

(54) FUEL CELL STACK HAVING A BYPASS FLOW PASSAGE

(75) Inventors: Manabu Tanaka, Utsunomiya (JP); Shigeru Inai, Tochigi-ken (JP); Yuya Sato, Tochigi-ken (JP); Minoru Koshinuma, Utsunomiya (JP); Masanori Hayashi, Utsunomiya (JP); Minoru Uoshima, Utsunomiya (JP); Shuhei Goto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 249 days.

(21) Appl. No.: 10/329,117

(22) Filed: Dec. 24, 2002

(65) Prior Publication Data
US 2003/0124407 A1 Jul. 3, 2003

(30) Foreign Application Priority Data
Dec. 28, 2001 (JP) .............................. 2001-400505

(51) Int. Cl.
*H01M 2/00* (2006.01)
*H01M 2/14* (2006.01)
*H01M 4/00* (2006.01)

(52) U.S. Cl. .............................. 429/34; 429/39; 429/40

(58) Field of Classification Search .................. 429/34, 429/39, 40
See application file for complete search history.

(56) References Cited

FOREIGN PATENT DOCUMENTS

| CA | 2399938 | 8/2001 |
|---|---|---|
| JP | 2000-006718 | 1/2000 |
| JP | 2001-118596 | * 4/2001 |
| JP | 2001-236975 | * 8/2001 |
| JP | 2001-266925 | * 9/2001 |
| WO | WO 01/59863 | 8/2001 |

OTHER PUBLICATIONS

Japanese patent office communication dated Jul. 18, 2006, with partial translation.

* cited by examiner

*Primary Examiner*—Dah-Wei Yuan
(74) *Attorney, Agent, or Firm*—Fish & Richardson P.C.

(57) ABSTRACT

A bypass plate and an intermediate plate are interposed between a stack body and a negative electrode terminal of a fuel cell stack. An oxygen-containing gas passage extends through the bypass plate and the stack body. The intermediate plate has a small opening. The opening has a cross sectional area smaller than a cross sectional area of the oxygen-containing gas supply passage. The opening is formed by an extension extending into the oxygen-containing gas supply passage. The extension removes water in the oxygen-containing gas, and discharges the water into a bypass flow passage.

12 Claims, 10 Drawing Sheets

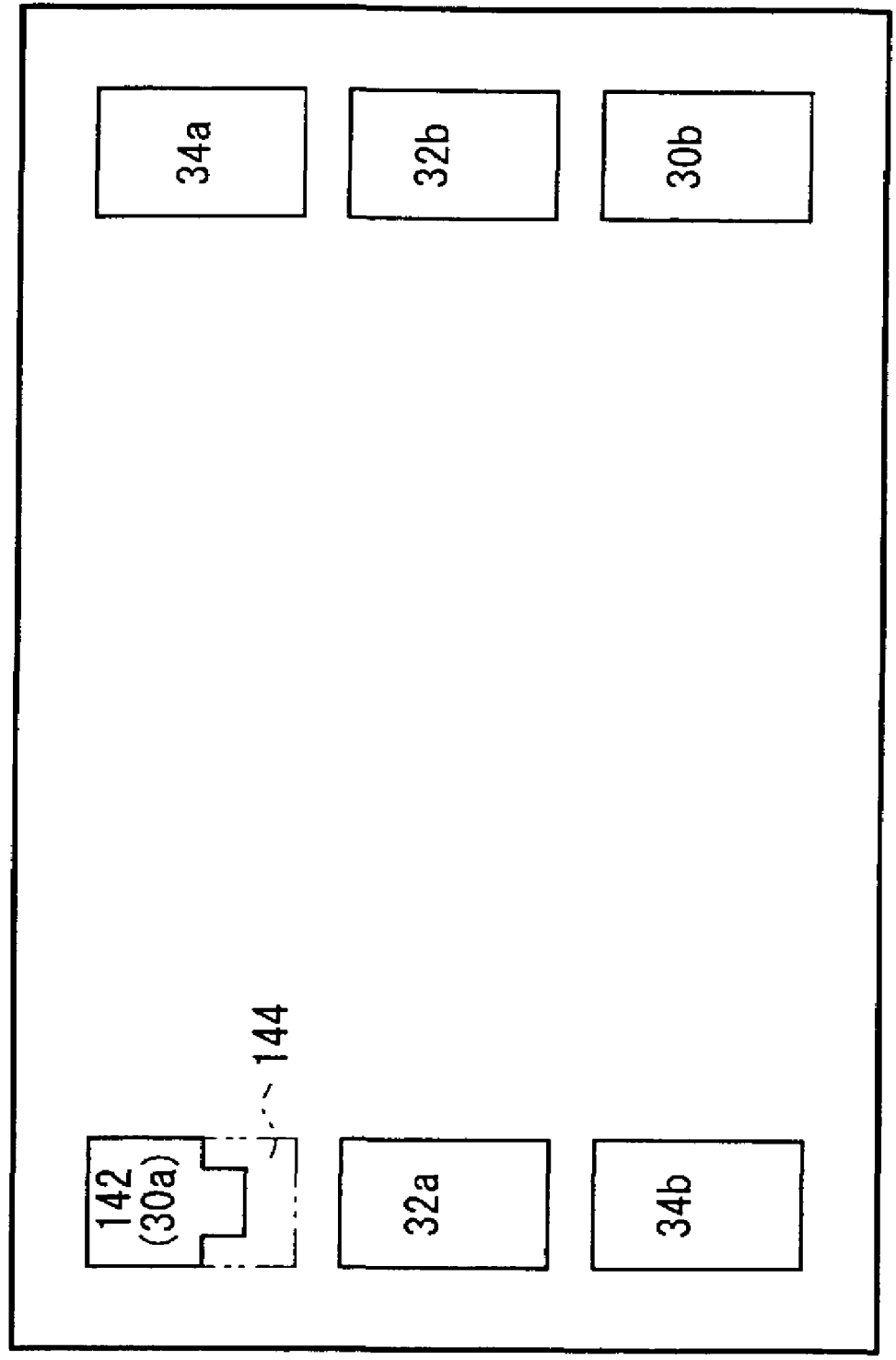

FUEL CELL STACK HAVING A BYPASS FLOW PASSAGE

BACKGROUND OF THE INVENTION

1. Field of the Invention

The present invention relates to a fuel cell stack formed by stacking a plurality of electrolyte electrode assemblies each including an anode, a cathode, and an electrolyte between the anode and the cathode. Each of the electrolyte electrode assemblies is interposed between separators.

2. Description of the Related Art

In recent years, various types of fuel cells are developed. For example, a solid polymer electrolyte fuel cell is known. The solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane (proton exchange membrane). Each of the electrodes comprises a catalyst and a porous carbon sheet. The membrane electrode assembly is interposed between separators (bipolar plates). The membrane electrode assembly and the separators make up a unit of the fuel cell (unit cell) for generating electricity. A plurality of unit cells are connected together to form a fuel cell stack.

In the fuel cell of the fuel cell stack, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

Generally, an oxygen-containing gas supply passage and a fuel gas supply passage (reactant gas supply passages) extend through the fuel cell stack in the stacking direction for supplying an oxygen-containing gas and a fuel gas (reactant gases) to the cathode and the anode, respectively. Further, an oxygen-containing gas discharge passage and a fuel gas discharge passage extend through the fuel cell stack in the stacking direction for discharging the fuel gas and the oxygen-containing gas and the fuel gas from the cathode and the anode.

The water produced in the chemical reactions on the power generation surfaces of the electrodes is likely to flow into the oxygen-containing gas discharge passage, and the water is retained in the oxygen-containing gas discharge passage. Further, the water may also be condensed, and retained in the fuel gas discharge passage. The retained water undesirably narrows or closes the oxygen-containing gas discharge passage and the fuel gas discharge passage to prevent the flows of the oxygen-containing gas and the fuel gas. As a result, power generation performance is decreased.

For example, Japanese laid-open patent publication No. 2001-236975 discloses a fuel cell stack which was made in an attempt to solve the problem. The fuel cell stack has an oxygen-containing gas supply passage and an oxygen-containing gas discharge passage in communication with the oxygen-containing gas supply passage. The oxygen-containing gas supply passage and the oxygen-containing discharge passage extend in the stacking direction. Additionally, a bypass plate having a bypass passage is provided remotely from an outlet (discharge port) of the oxygen-containing gas discharge passage. An inlet of the bypass passage is connected to the oxygen-containing gas supply passage and an outlet of the bypass passage is connected to the oxygen-containing gas discharge passage. The oxygen introduced into the oxygen-containing gas supply passage partially flows into the inlet of the bypass passage, flows out of the outlet of the bypass passage, and flows into the oxygen-containing gas discharge passage. Thus, the water retained remotely from the outlet of the oxygen-containing gas discharge passage is desirably pushed out by the flow of the oxygen-containing gas. The retained (condensed) water generated in the chemical reactions is smoothly discharged from the fuel cell stack. Therefore, the power generation performance is not decreased.

At the time of starting the operation of the fuel cell stack, or at the time of restarting the operation of the fuel cell stack after a temporary interruption of the operation, condensed water may be present in the pipes for supplying the reactant gases (oxygen-containing gas and/or fuel gas) to the body of the fuel cell stack.

In particular, in the pipe for supplying the oxygen-containing gas, a large amount of condensed water may be generated. At the time of starting the operation of the fuel cell stack, the condensed water may drip onto the power generation surfaces (reaction surfaces) of the electrodes near a reaction gas inlet (supply port). Due to the condensed water, the supply of the reaction gases may not be carried out smoothly. Therefore, the power generation performance of unit cells may be decreased.

In the fuel cell stack, a plurality of unit cells are electrically connected. Each of the unit cells outputs an electric current of an identical level. Therefore, if any of the unit cells outputs an electric current of a low level, all of the unit cells output the low electric current. Thus, the power generation performance of the overall fuel cell stack is limited by the low electric current. If the unit cells are operated continuously with the low power outputting capability due to the condensed water, the unit cells may be damaged by the electric current beyond the capability of the unit cells.

For example, Japanese laid-open patent publication No. 2000-6718 discloses a fuel cell stack which was made in an attempt to solve the problem. In the fuel cell stack, a dehumidifying mechanism is disposed between the end plates at opposite ends of the fuel cell stack in the stacking direction. The dehumidifying mechanism is positioned in the gas passage which extends from a reactant gas supply port to the first unit cell. The dehumidifying mechanism has a chamber for adjusting the amount of water in the reactant gas depending on the temperature of the unit cell, and discharging means for discharging the excessive water from the chamber.

When the reactant gas flows into the chamber from the reactant gas supply port, the amount of water in the chamber is adjusted depending on the temperature of the unit cell adjacent to the chamber by discharging the excessive water from the chamber using the discharging means. In this manner, the humidity in the reactant gas to be supplied to the unit cell is suitably maintained, and water condensation is effectively prevented.

SUMMARY OF THE INVENTION

The present invention relates to the technology for adjusting the amount of water in the reactant gas. A main object of the present invention is to provide a fuel cell stack having a simple and compact structure in which a reactant gas having a desirable humidity can be supplied to electrolyte electrode assemblies.

In the present invention, a fuel cell stack comprises a stack body formed by a plurality of electrolyte electrode assemblies stacked together in a stacking direction. Each of the electrolyte electrode assemblies is interposed between separators, and includes electrodes and an electrolyte interposed between the electrodes.

A reactant gas supply passage extends through the stack body in the stacking direction for supplying a reactant gas to the electrodes, and a reactant gas discharge passage extends through the stack body in the stacking direction for discharging the reactant gas from the stack body. The reactant gas includes at least one of an oxygen-containing gas and a fuel gas.

The fuel cell stack comprises a bypass flow passage connected to the reactant gas supply passage at a position near an inlet of the reactant gas supply passage, and connected to the reactant gas discharge passage. Further, the fuel cell stack comprises an extension for removing water from the reactant gas at a position near the inlet of the reactant gas supply passage, and discharging the water into the bypass flow passage.

With the simple and compact structure, it is possible to prevent the water from being dripped on to the power generation surfaces of the electrodes. Therefore, it is possible to effectively maintain the power generation performance of the fuel cell stack.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a front showing an intermediate plate.

DESCRIPTION OF THE PREFERRED EMBODIMENTS

Figure 1:
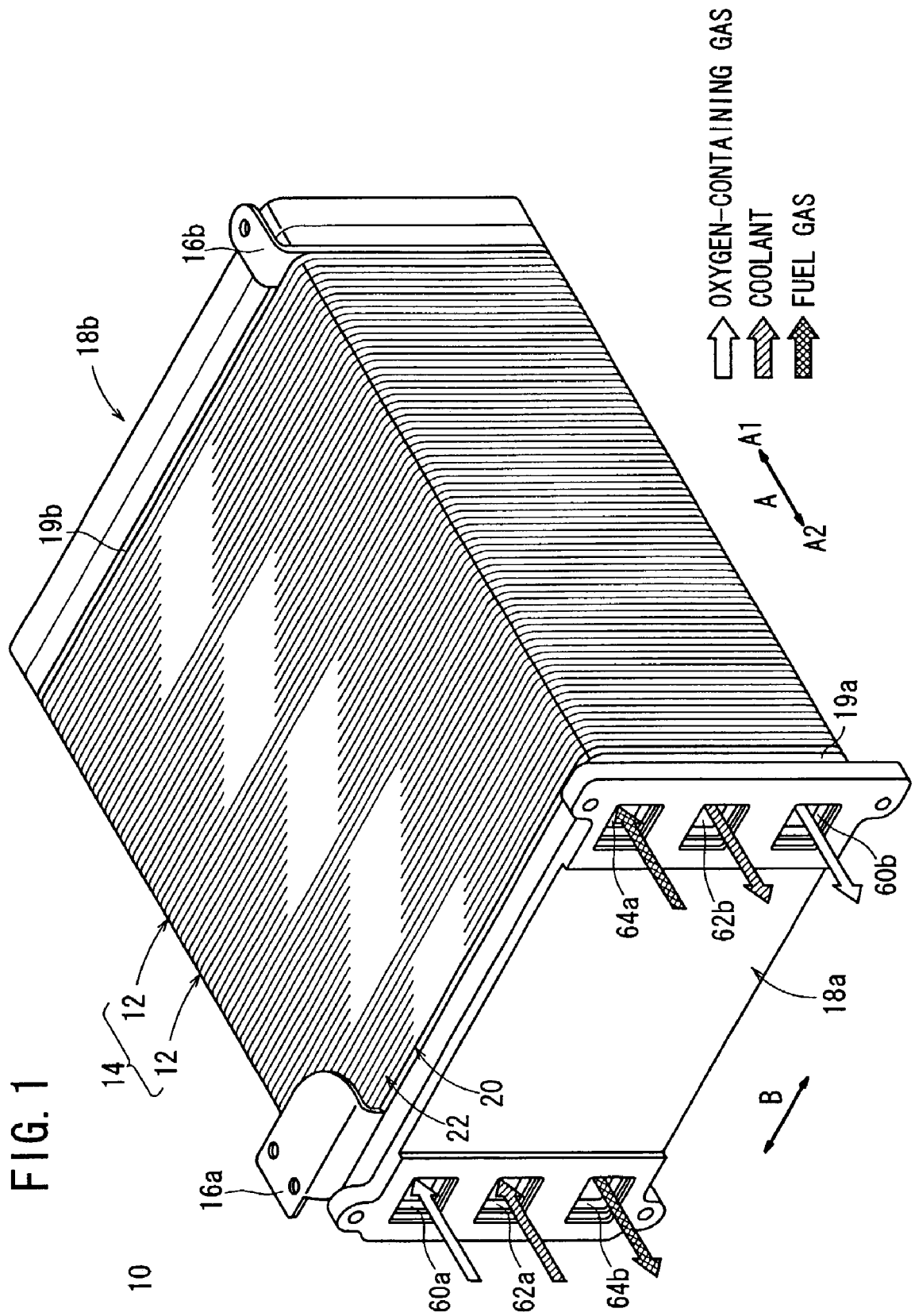
FIG. 1 is a schematic perspective view showing a fuel cell stack according to a first embodiment of the present invention.
Figure 2:
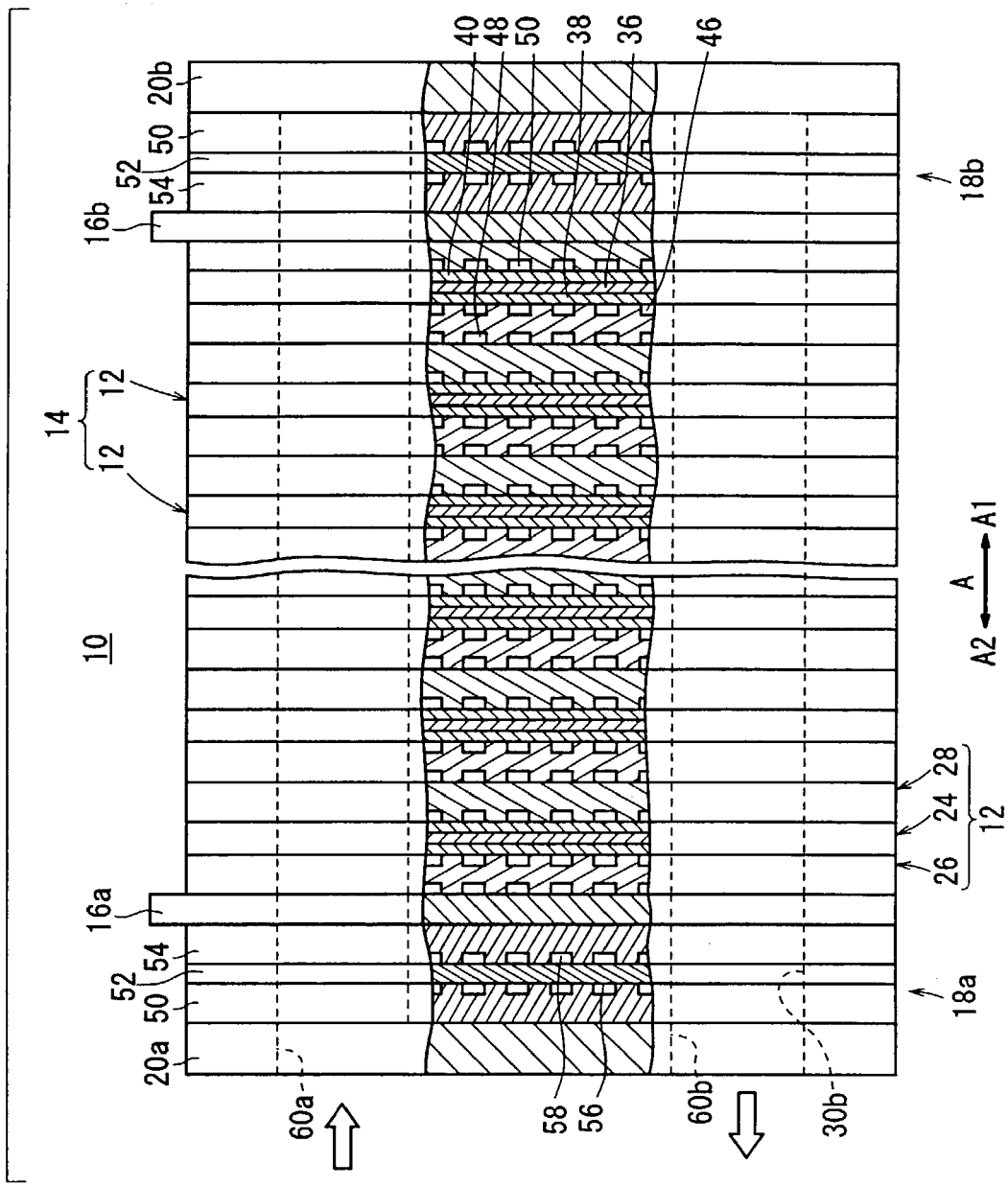
FIG. 2 is a cross sectional side view showing a part of the fuel cell stack.

FIG. 1 is a schematic perspective view showing a fuel cell stack 10 according to a first embodiment of the present invention. FIG. 2 is a cross sectional side view showing a part of the fuel cell stack 10.

The fuel cell stack 10 comprises a stack body 14 formed by stacking a plurality of unit cells 12 in a direction indicated by an arrow A (stacking direction). At opposite ends of the stack body 14 in the stacking direction, a negative electrode terminal 16a, and a positive electrode terminal 16b are formed. Insulator plates 19a, 19b are formed on the outside of the negative current terminal 16a and the positive current terminal 16b, respectively. Further, end plates 18a, 18b are formed on the outside of the insulator plates 19a, 19b, respectively. As shown in FIG. 2, a bypass plate 20 and an intermediate plate (plate member) 22 are interposed between the negative current terminal 16a and the stack body 14.

Figure 3:
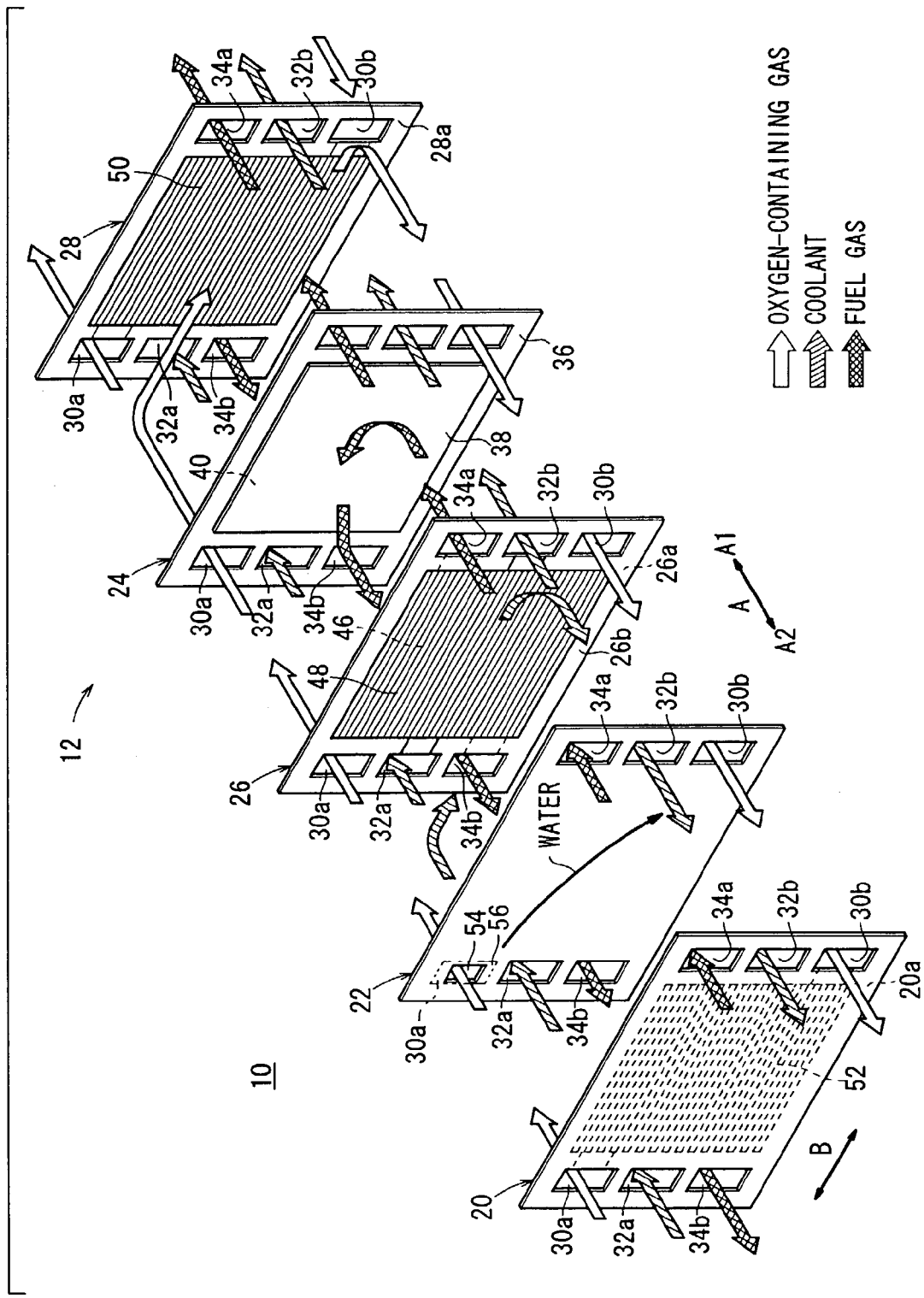
FIG. 3 is an exploded perspective view showing a unit cell of the fuel cell stack.

As shown in FIG. 3, each of the unit cells 12 includes a membrane electrode assembly (electrolyte electrode assembly) 24 and first and second separators 26, 28. The membrane electrode assembly 24 is interposed between the first separator 26 and the second separator 28. Each of the first separator 26 and the second separator 28 is formed of a thin sheet (plate) made of carbon or metal, for example.

At an end of the membrane electrode assembly 24 and the first and the second separators 26 in the longitudinal direction indicated by an arrow B, an oxygen-containing gas supply passage (reactant gas supply passage) 30a for supplying an oxygen-containing gas, a coolant supply passage 32a for supplying coolant, and a fuel gas discharge passage (reactant gas discharge passage) 34b for discharging a fuel gas such as a hydrogen-containing gas are formed. The oxygen-containing gas supply passage 30a, the coolant supply passage 32a, and the fuel gas discharge passage 34b extend in the direction indicated by the arrow A.

At the other end of the membrane electrode assembly 24 and the first and the second separators 26 in the longitudinal direction, a fuel gas supply passage (reactant gas supply passage) 34a for supplying the fuel gas, a coolant discharge passage 32b for discharging the coolant, and an oxygen-containing gas discharge passage (reactant gas discharge passage) 30b for discharging the oxygen-containing gas are formed. The fuel gas supply passage 34a, the coolant discharge passage 32b, and the oxygen-containing gas discharge passage 30b extend in the direction indicated by the arrow A.

The membrane electrode assembly 24 comprises an anode 38, a cathode 40, and an ion exchange membrane 36 of a solid electrolyte interposed between the anode 38 and the cathode 40. The ion exchange membrane 36 is formed by impregnating a thin membrane of perfluorosulfonic acid with water, for example.

Figure 4:
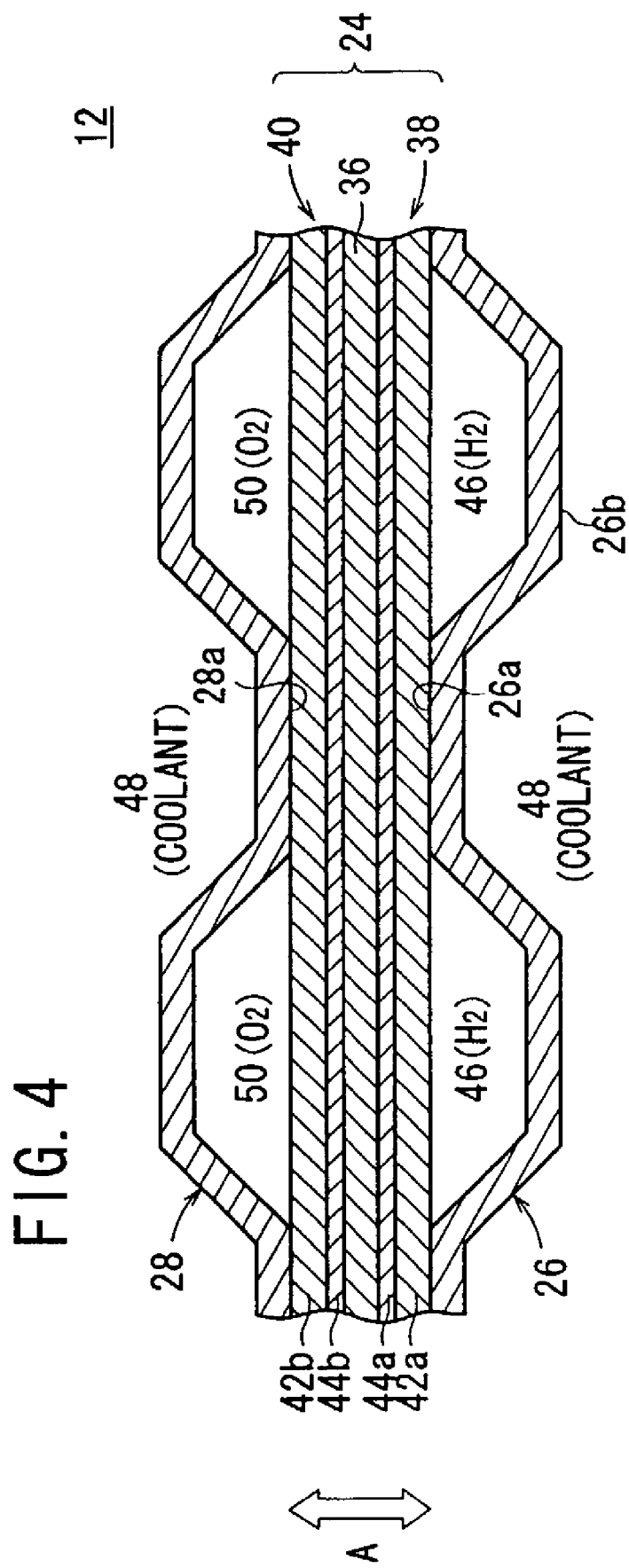
FIG. 4 is an enlarged cross sectional view showing a part of the unit cell.

As shown in FIG. 4, each of the anode 38 and cathode 40 has a gas diffusion layer 42a, 42b such as a carbon paper, and an electrode catalyst layer 44a, 44b of platinum alloy supported on carbon particles. The carbon particles are deposited uniformly on the surface of the gas diffusion layer 42a, 42b. The electrode catalyst layer 44a of the anode 14a, and the electrode catalyst layer 44b of the cathode 16a are fixed to both surfaces of the ion exchange membrane 36, respectively.

As shown in FIGS. 3 and 4, the first separator 26 has a fuel gas flow passage 46 on its surface 26a facing the membrane electrode assembly 24. The fuel gas flow passage 46 is connected to the fuel gas supply passage 34a at one end, and connected to the fuel gas discharge passage 34b at the other end. The fuel gas flow passage 46 comprises a plurality of grooves extending in the direction indicated by the arrow B, for example. Further, a coolant flow passage 48 is formed on a surface 26b of the first separator 26. The coolant flow passage 48 is connected to the coolant supply passage 32a at one end, and connected to the coolant discharge passage 32b at the other end. The coolant flow passage 48 comprises a plurality of grooves extending in the direction indicated by the arrow B, for example.

The second separator 28 has an oxygen-containing gas flow passage 50 comprising a plurality of grooves on its surface 28a facing the membrane electrode assembly 24. The oxygen-containing gas flow passage 50 is connected to the oxygen-containing gas supply passage 30a at one end, and connected to the oxygen-containing gas discharge passage 30b at the other end. The oxygen-containing gas flow passage 50 comprises a plurality of grooves extending in the direction indicated by the arrow B, for example.

Figure 5:
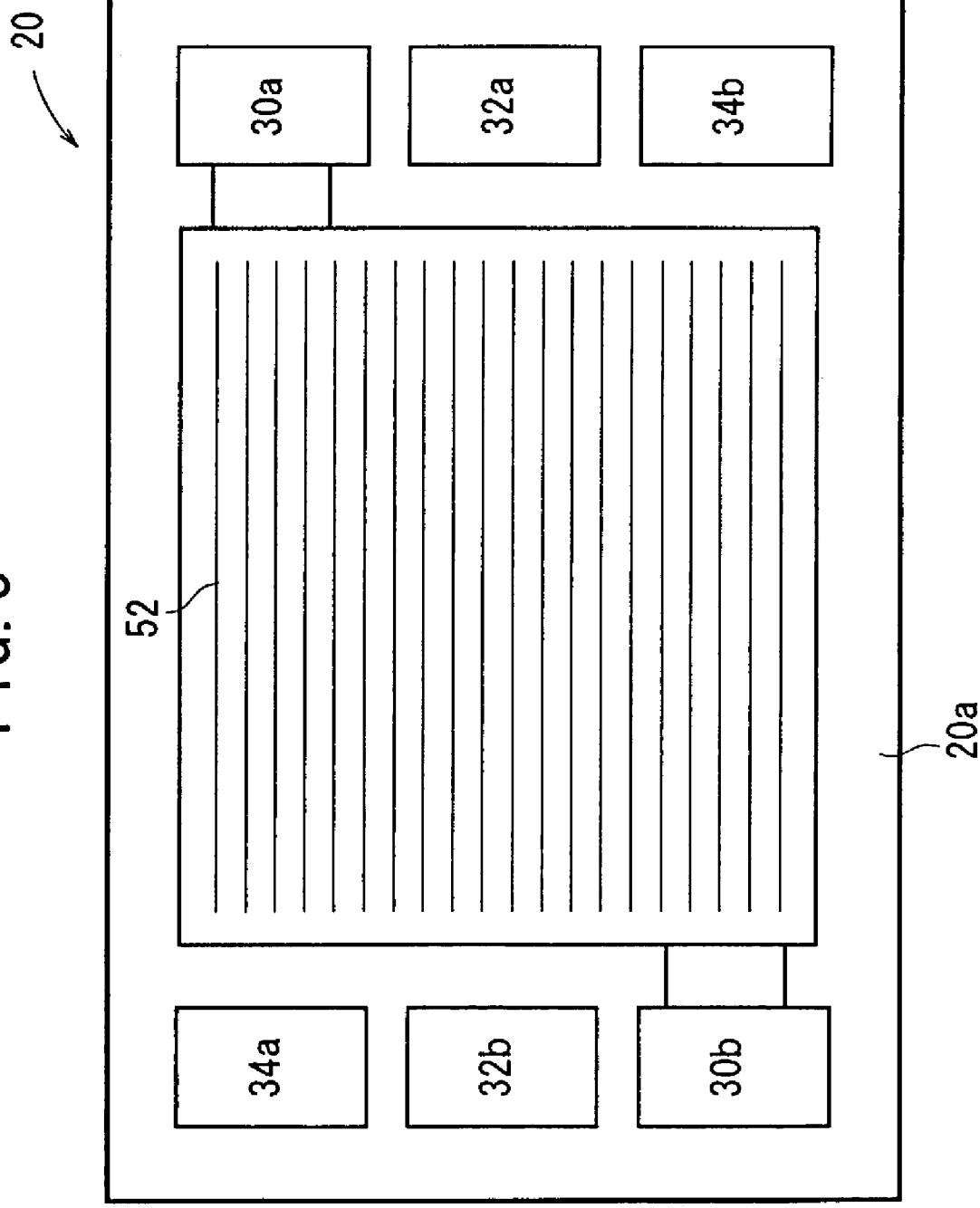
FIG. 5 is a front view showing a bypass plate of the fuel cell stack.

The bypass plate 20 has the similar structure with the second separator 28, for example. As shown in FIG. 5, the bypass plate 20 has a bypass flow passage 52 on its surface 20a facing the intermediate plate 22. The bypass flow passage is connected to the oxygen-containing gas supply passage 30a at one end, and connected to the oxygen-containing gas discharge passage 30b at the other end. Specifically, in the fuel cell stack 10, the bypass flow passage 52 is connected to the oxygen-containing supply passage 30b at a position near an inlet of the oxygen-containing gas supply passage 30a, and connected to the oxygen-containing gas discharge passage 30b at a position near an outlet of the oxygen-containing gas discharge passage 30b (see FIG. 2).

The intermediate plate 22 faces the surface 20a of the bypass plate 20. As shown in FIGS. 2 and 3, the intermediate plate 2 has an opening 54 at a position corresponding to the oxygen-containing gas supply passage 30a. The opening 54 has a cross sectional area smaller than a cross sectional area (opening area) of the oxygen-containing gas supply passage 30a. An extension 56 is formed around the opening 54 of the intermediate plate 22 for catching (removing) water in the oxygen-containing gas flowing in the oxygen-containing gas supply passage 30a at the bypass plate 20, and discharging the water into the bypass flow passage 52.

As shown in FIG. 1, at an end of the end plate 18a in the longitudinal direction indicated by the arrow B, an oxygen-containing gas supply port 60a, a coolant supply port 62a, and a fuel gas discharge port 64b are formed. The oxygen-containing gas supply port 64a is connected to the oxygen-containing gas supply passage 30a. The coolant supply port 62a is connected to the coolant supply passage 32a. The fuel gas discharge port 64b is connected to the fuel gas discharge passage 34b. At the other end of the end plate 18a in the longitudinal direction indicated by the arrow B, a fuel gas supply port 64a, a coolant discharge port 62b, and an oxygen-containing gas discharge port 60b are formed. The fuel gas supply port 64a is connected to the fuel gas supply passage 34a. The coolant, discharge port 62b is connected to the coolant discharge passage 32b. The oxygen-containing gas discharge port 60b is connected to the oxygen-containing gas discharge passage 30b.

Next, operations of the fuel cell stack 10 according to the first embodiment will be described below.

In the fuel cell stack 10, a fuel gas such as a hydrogen-containing gas is supplied to the fuel gas supply port 64a, and an oxygen-containing gas such as air is supplied to the oxygen-containing gas supply port 60a. Further, a coolant such as pure water, an ethylene glycol or an oil is supplied to the coolant supply port 62a.

From the fuel gas supply port 64a, the oxygen-containing gas supply port 60a, and the coolant supply port 62a, the fuel gas, the oxygen-containing gas, and the coolant are supplied in series in the direction indicated by the arrow A1 to each of the unit cells 12 stacked together in the direction indicated by the arrow A to form the cell stack 10.

As shown in FIG. 3, the oxygen-containing gas flows into the oxygen-containing gas flow passage 50 from the oxygen-containing gas supply passage 30a, and flows along the cathode 40 of the membrane electrode assembly 24 to induce an electrochemical reaction at the cathode 40. The fuel gas flows into the fuel gas flow passage 46 of the first separator from the fuel gas supply passage 34a, and flows along the anode 38 of the membrane electrode assembly 24 to induce an electrochemical reaction at the anode 38.

In the membrane electrode assembly 24, the oxygen-containing gas supplied to the cathode 40, and the fuel gas supplied to the anode 38 are consumed in the electrochemical reactions at catalyst layers 44b, 44a of the cathode 40 and the anode 38 for generating electricity.

After the fuel gas is consumed at the anode 38, the fuel gas flows into the fuel gas discharge passage 34b, and flows in the direction indicated by the arrow A2. Then, the fuel gas is discharged from the fuel gas discharge port 64b of the end plate 18a. Similarly, after the oxygen-containing gas is consumed at the cathode 40, the oxygen-containing gas flows into the oxygen-containing gas discharge passage 30b, and flows in the direction indicated by the arrow A2. Then, the oxygen-containing gas is discharged from the oxygen-containing gas discharge port 60b of the end plate 18a.

The coolant supplied to the coolant supply port 62a flows through the coolant supply passage 32a, and flows into the coolant flow passage 48 of the first separator 26. Then, the coolant flows in the direction indicated by the arrow B. After the coolant is used for cooling the membrane electrode assembly 24, the coolant flows through the coolant discharge passage 32b in the direction indicated by the arrow A2, and the coolant is discharged from the coolant discharge port 62b of the end plate 18a.

At the time of starting the operation of the fuel cell stack 10, or at the time of restarting the operation of the fuel cell stack 10 after a temporary interruption of the operation, the pipe for supplying the oxygen-containing gas to the fuel cell stack 10 is cooled, and water vapor is likely to be condensed into liquid water. Therefore, the condensed water may be present in the pipe for supplying the oxygen-containing gas to the fuel cell stack 10.

In an attempt to solve the problem, the fuel cell stack 10 of the first embodiment uses the bypass plate 20 and the intermediate plate 22 at a position near the inlet of the oxygen-containing gas supply passage 30a. The bypass plate 20 and the intermediate plate 22 are positioned between the negative electrode terminal 16a and the stack body 14. When the oxygen-containing gas supplied to the oxygen containing gas supply port 60a of the end plate 18a flows in the oxygen-containing gas supply passage 30a at the bypass plate 20 toward the opening 54 of the intermediate plate 22, water in the oxygen-containing gas is removed by the extension 56 formed around the opening 54.

Therefore, the oxygen-containing gas having a desirable humidity is supplied to the stack body 14, and water removed by the extension 56 flows into the bypass flow passage 52 formed on the surface 20a of the bypass plate 20. The water flows from the bypass flow passage 52 into the oxygen-containing gas discharge passage 30b. Then, the water is discharged from the oxygen containing gas discharge port 60b of the end plate 18a.

Thus, in the first embodiment, the condensed water does not flow into the stack body 14, and it is possible to prevent the condensed water from being dripped onto the power generation surfaces of the electrodes. Accordingly, the power generation performance of the overall fuel cell stack 10 is maintained effectively. The first embodiment can be carried out simply by providing the bypass plate 20 and the intermediate plate 22 between the negative electrode terminal 16a and the stack body 14. With the simple and compact structure, it is possible to remove the excessive water in the oxygen-containing gas.

Figure 6:
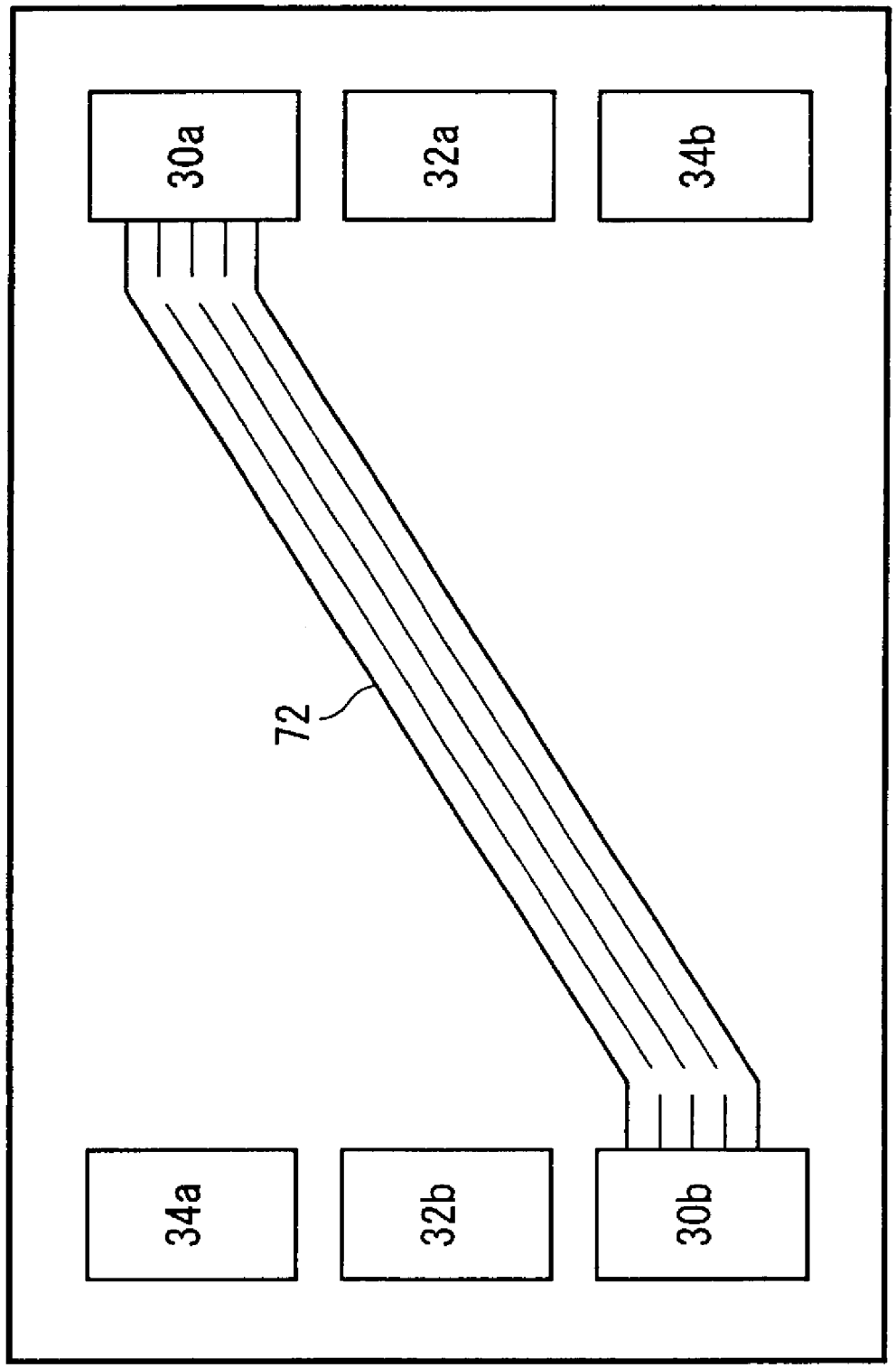
FIG. 6 is a front view showing a bypass plate of a fuel cell stack according to a second embodiment of the present invention.

FIG. 6 is a front view showing a bypass plate 70 of a fuel cell stack according to a second embodiment of the present invention. In FIG. 6, the constituent elements that are identical to those of the bypass plate 20 of the fuel cell stack 10 in the first embodiment are labeled with the same reference numeral, and description thereof is omitted.

The bypass plate 70 has a bypass flow passage 72 for connecting the oxygen-containing gas supply passage 30a and the oxygen-containing gas discharge passage 30b. The bypass flow passage 72 comprises a certain number of grooves having an inclination from the oxygen-containing gas supply passage 30a to the oxygen-containing gas discharge passage 30b.

In the second embodiment, water removed from the oxygen-containing gas flows smoothly along the slope of the bypass flow passage 72 into the oxygen-containing gas discharge passage 30b. The bypass flow passage 72 is narrow. Therefore, it is possible to limit the amount of the oxygen-containing gas which does not flow through the stack body 14, and which is directly discharged through the bypass flow passage 72. Thus, it is possible to use the oxygen-containing gas efficiently.

Figure 7:
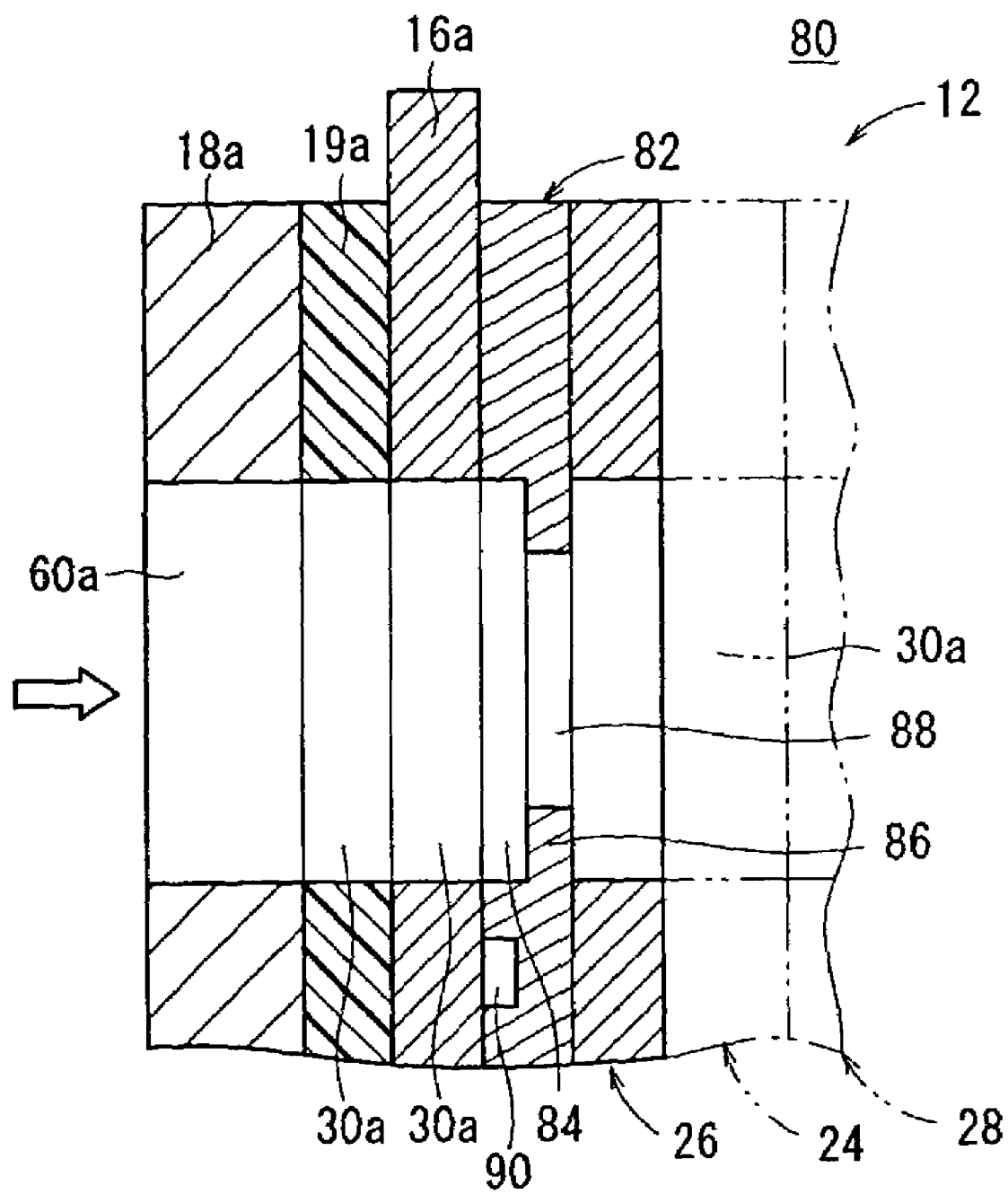
FIG. 7 is a cross sectional view showing a part of a fuel cell stack according to a third embodiment of the present invention.

FIG. 7 is a cross sectional view showing a part of a fuel cell stack 80 according to a third embodiment of the present invention. In the third embodiment, the constituent elements that are identical to those of the fuel cell stack 10 in the first embodiment are labeled with the same reference numeral, and description thereof is omitted. Further, in fourth and fifth embodiments as described later, the constituent elements that are identical to those of the fuel cell stack 10 in the first embodiment are labeled with the same reference numeral, and description thereof is omitted.

In the fuel cell stack 80, a bypass plate 82 is interposed between a negative electrode terminal 16a and a first separator 26. The bypass plate 82 has a first opening 84 at a position corresponding to an oxygen-containing gas supply passage 30a. Further, the bypass plate 82 has a second opening 88 adjacent to the first opening 84. The second opening 88 is formed inside an extension 86 of the bypass plate 82, and thus, the second opening 88 is smaller than the first opening 84.

The extension 86 removes water in the oxygen-containing gas in the oxygen-containing gas supply passage 30a supplied from the oxygen-containing gas supply port 60a of the end plate 18a, and discharges the water into a bypass flow passage 90.

The third embodiment can be carried out simply by using the single bypass plate 82. Therefore, the overall size of the fuel cell stack 80 is small.

Figure 8:
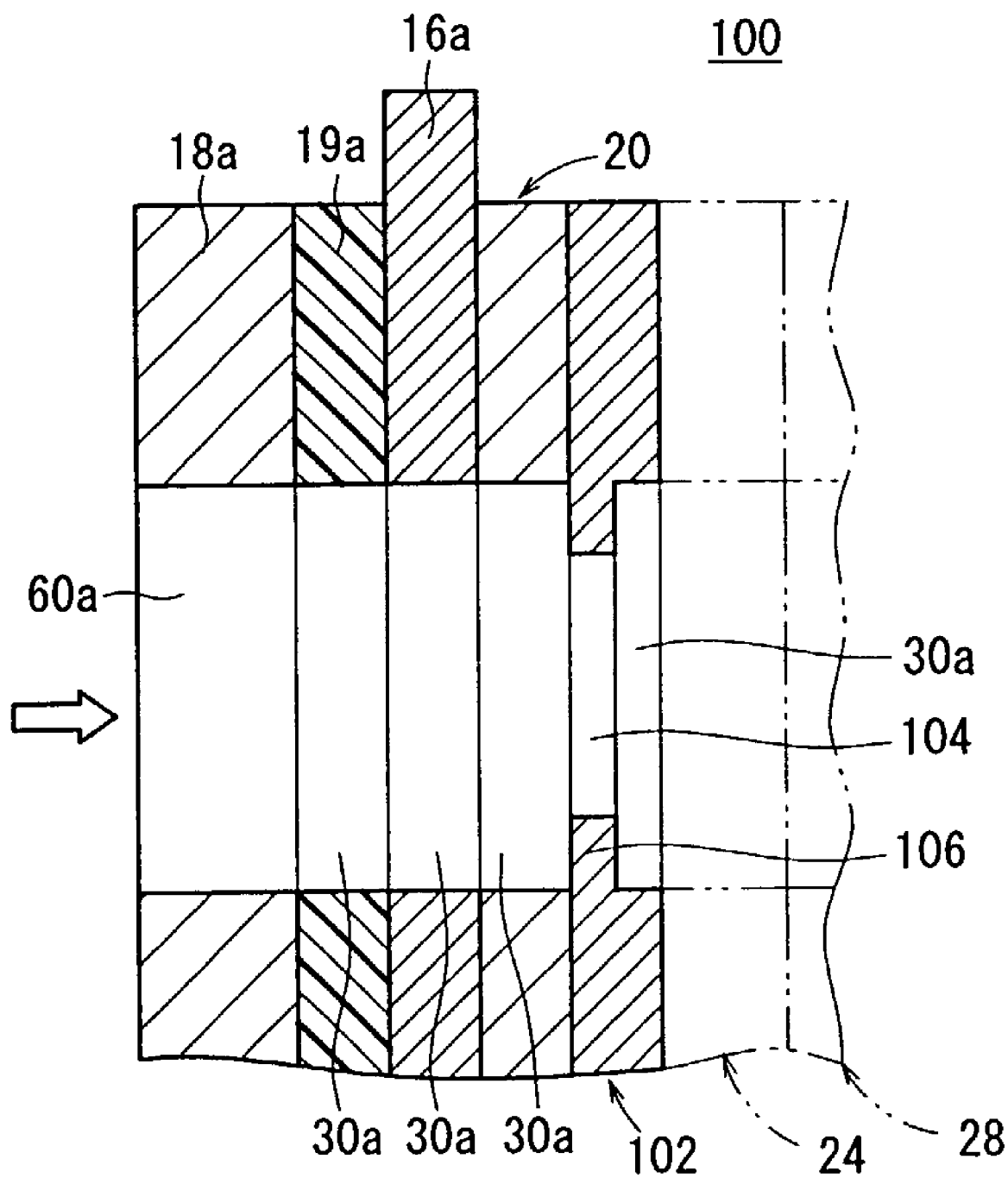
FIG. 8 is a cross sectional view showing a part of a fuel cell stack according to a fourth embodiment of the present invention.

FIG. 8 is a cross sectional view showing a part of a fuel cell stack 100 according to the fourth embodiment of the present invention.

The fuel cell stack 100 has a first separator (plate member) 102 instead of the first separator 26. The first separator 102 has an opening 104. The opening 104 has a cross sectional area smaller than the cross sectional area of the oxygen-containing gas supply passage 30a. An extension 106 of the first separator 102 forms a circumferential surface around the opening 104.

Thus, in the fourth embodiment, when the oxygen-containing gas supplied from the oxygen-containing gas supply port 60a flows into the oxygen-containing gas supply passage 30a, the water in the oxygen-containing gas is removed by the extension 106 of the first separator 102. The water is discharged through a bypass flow passage (not shown) of the bypass plate 20, and the oxygen-containing gas having a desirable humidity is supplied to the membrane electrode assembly 24.

Figure 9:
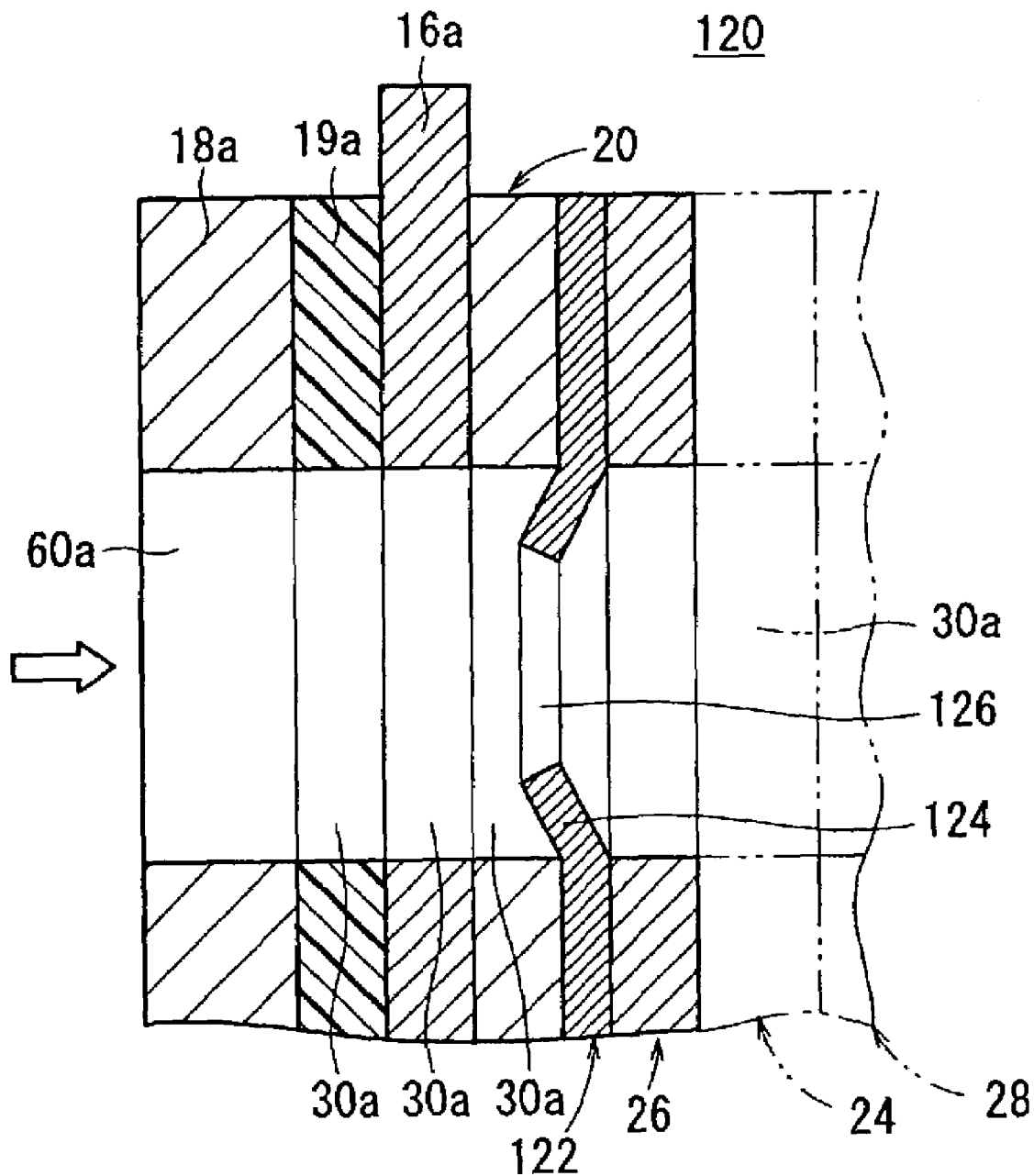
FIG. 9 is a cross sectional view showing a part of the fuel cell stack according to a fifth embodiment of the present invention.

FIG. 9 is a cross-sectional view showing a part of a fuel cell stack 120 according to the fifth embodiment of the present invention.

In the fuel cell stack 120, an intermediate plate (plate member) 122 is provided adjacent to a bypass plate 20. The intermediate plate 122 has an inclined extension 124 inclined toward the bypass plate 20. A small opening 126 having a cross sectional area smaller than the sectional area of the oxygen-containing gas supply passage 30a is formed inside the inclined extension 124.

In the fifth embodiment, when the oxygen-containing gas flowing in the oxygen-containing gas supply passage 30a comes to a position of the bypass plate 20, water in the oxygen-containing gas is removed by the inclined extension 124. Then, the oxygen-containing gas flows through the opening 126 of the intermediate plate 122. The inclined extension is inclined toward the bypass plate 20, i.e., in a direction opposite to the flowing direction of the oxygen-containing gas. Therefore, the water is efficiently removed from the oxygen-containing gas, and the water does not enter the small opening 126 toward the first separator 26. Thus, it is possible to prevent the water from being dripped onto the power generation surfaces of the electrodes.

In the fifth embodiment, the intermediate plate 122 has the inclined extension 124. Alternatively, the bypass plate 82 shown in FIG. 7 may have an inclined extension 86, and the first separator 102 shown in FIG. 8 may have an extension 106 inclined toward the bypass plate 20.

Further, an intermediate plate 140 having an opening 142 as shown in FIG. 10 may be used instead of the intermediate plates 22, 122.

The opening 142 has an extension 144 extending into the oxygen-containing gas supply passage 30a. The extension 144 is formed only at a lower part of the opening 142, i.e., the extension 144 is positioned lower than the substantially central position of the opening 142. Therefore, the cross sectional area of the extension 144 is small in comparison with the extensions in the other embodiments. Thus, the pressure loss of the oxygen-containing gas at the opening 142 is small.

In the first through fifth embodiments, the water is removed from the oxygen-containing gas. Alternatively, the water may be removed from the fuel gas.

In the present invention, the fuel cell stack has a bypass flow passage connecting the reactant gas supply passage at a position near the inlet of the reactant gas supply passage, and the reactant gas discharge passage. The water in the reactant gas is caught (removed) by an extension for discharging the water into the bypass flow passage. With the simple and compact structure, it is possible to prevent the power generation surfaces of electrodes from being covered by the water, and maintain the power generation performance of the fuel cell stack.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising a stack body formed by a plurality of electrolyte electrode assemblies stacked together in a stacking direction between first and second end plates, said electrolyte electrode assemblies each interposed between separators, and including electrodes and an electrolyte interposed between said electrodes, wherein a reactant gas supply passage extends through at least one port in the first end plate and through said stack body in said stacking direction for supplying a reactant gas to said electrodes, and a reactant gas discharge passage extends through at least one port in the first end plate and through said stack body in said stacking direction for discharging said reactant gas from said stack body, said reactant gas including at least one of an oxygen-containing gas and a fuel gas, said fuel cell stack further comprising:

a bypass flow passage connected to said reactant gas supply passage at a position near an inlet of said reactant gas supply passage and near said first end plate, and connected to said reactant gas discharge passage; and an extension for removing water from said reactant gas at a position near said inlet of said reactant gas supply passage, and discharging said water into said bypass flow passage.

2. A fuel cell stack according to claim 1, wherein a flowing direction of said reactant gas in said reactant gas supply passage is opposite to a flowing direction of said reactant gas in said reactant gas discharge passage;

said reactant gas supply passage is positioned above said reactant gas discharge passage;

said bypass flow passage is connected to said reactant gas discharge passage at a position near an outlet of said reactant gas discharge passage; and said extension extends partially into said reactant gas supply passage.

3. A fuel cell stack according to claim 2, further comprising:

a bypass plate having said bypass flow passage disposed outside said stack body; and an electrode terminal disposed outside said bypass plate but inside said first end plate, wherein said extension is formed by an opening of said bypass plate, said opening having a cross sectional area smaller than a cross sectional area of said reactant gas supply passage.

4. A fuel cell stack according to claim 3, wherein said bypass flow passage is inclined from said reactant gas supply passage toward said reactant gas discharge passage.

5. A fuel cell stack according to claim 2, further comprising:

a bypass plate and a plate member disposed outside said stack body, said bypass plate having said bypass flow passage;

an electrode terminal disposed outside said bypass plate and said plate member; and said first end plate being disposed outside of said electrode terminal, wherein said extension is formed by an opening of said plate member, said opening having a cross sectional area smaller than a cross sectional area of said reactant gas supply passage.

6. A fuel cell stack according to claim 5, wherein said bypass flow passage is inclined from said reactant gas supply passage toward said reactant gas discharge passage.

7. A fuel cell stack according to claim 2, further comprising:

a bypass plate and a plate member disposed outside said stack body, said bypass plate having said bypass flow passage; and an electrode terminal disposed outside said bypass plate and said plate member, but inside of said first end plate, wherein said plate member includes a part of said reactant gas supply passage and an opening having a cross sectional area smaller than a cross sectional area of said reactant gas supply passage, and said extension forms a circumferential wall surface of said opening.

8. A fuel cell stack according to claim 2, further comprising:

a bypass plate and a plate member disposed outside said stack body, said bypass plate having said bypass flow passage;

an electrode terminal disposed outside said bypass plate and said plate member; and said first end plate being disposed outside of said electrode terminal, wherein said extension is formed on said plate member, and extends toward said bypass plate, and an opening is formed inside said extension, said opening having a cross sectional area smaller than a cross sectional area of said reactant gas supply passage.

9. A fuel cell stack according to claim 1, wherein said extension is disposed at least at a lower part of said reactant gas supply passage.

10. A fuel cell stack according to claim 1, wherein the bypass flow passage is connected to said reactant gas discharge passage near a reactant gas discharge port.

11. A fuel cell stack according to claim 1, wherein:

the bypass flow passage is connected to said reactant gas supply passage upstream of said electrodes; and wherein the bypass flow passage is connected to said reactant gas discharge passage downstream of said electrodes.

12. A fuel cell stack according to claim 1, further comprising:

a reactant gas supply port, through which the reactant gas enters the fuel cell stack; and a reactant gas discharge port, through which the reactant gas exits the fuel cell stack;

wherein the reactant gas supply port and the reactant gas discharge port are formed in the first end plate.

* * * * *